UNITED STATES PATENT OFFICE.

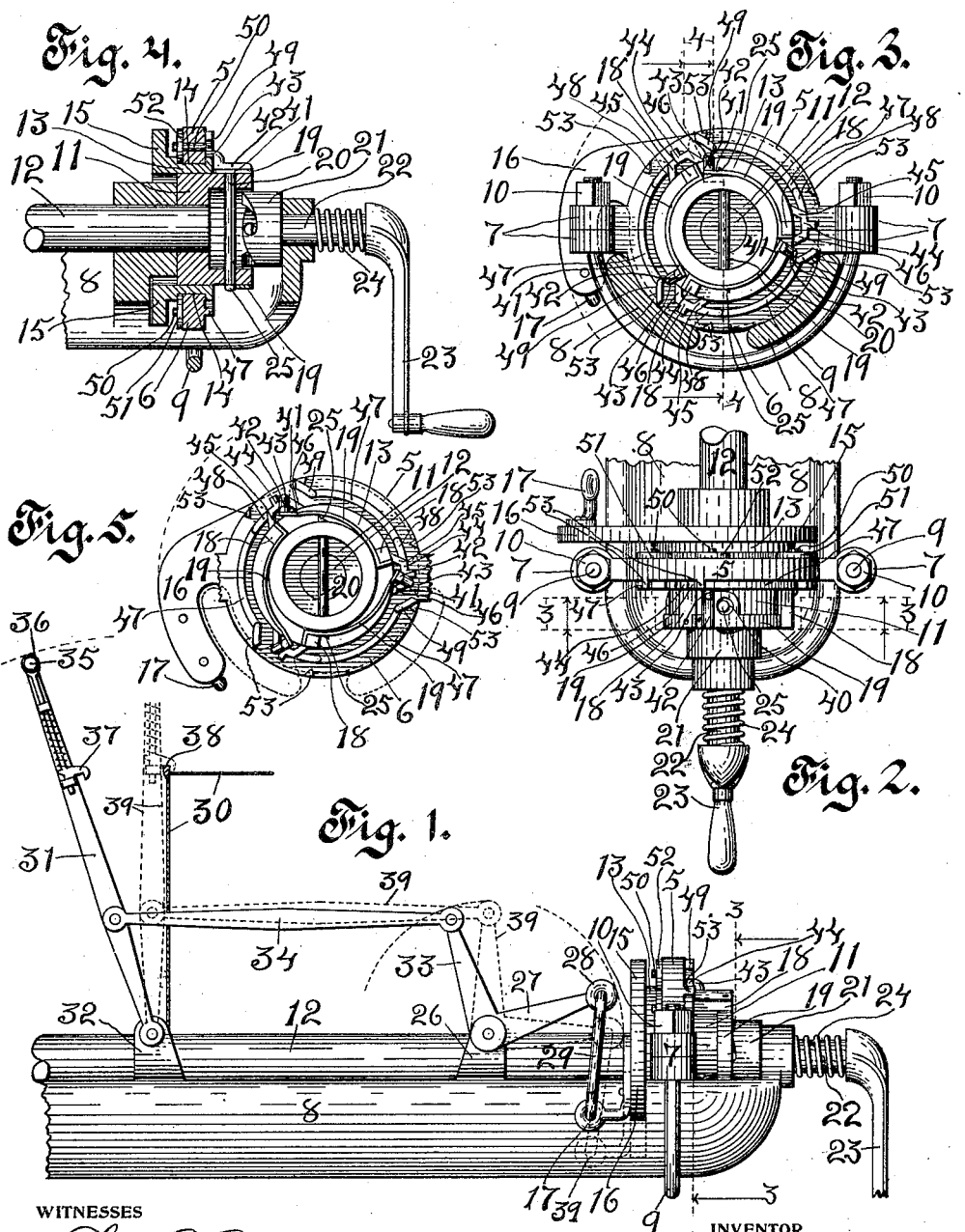

HARRY B. FENNER, OF OMAHA, NEBRASKA.

AUTOMOBILE ENGINE-STARTER.

1,102,651.　　　　　Specification of Letters Patent.　　Patented July 7, 1914.

Application filed November 27, 1912. Serial No. 733,786.

*To all whom it may concern:*

Be it known that I, HARRY B. FENNER, a citizen of the United States of America, residing at Omaha, in the county of Douglas and State of Nebraska, have invented certain new and useful Improvements in Automobile Engine-Starters, of which the following is a specification.

My invention relates to improvements in automobile explosive engine starters by which the chauffeur is enabled to crank the engine while in his seated position as driver of the motor-car; and the objects of my improvement are, first, to provide a contrivance that by slight modifications can be applied to any automobile and connected with its engine shaft without removing or obstructing its present cranking device; second, a series of connected levers, one of which is an operating lever automatically locked out of the way, in reach of the seated driver, in which locked position operative connection of the device with the engine shaft is broken; third, means for attaching to the engine bed the stationary parts of my contrivance on which is mounted the movable parts of the device; fourth, an oscillatory or rockable pawl-carrying member with an actuating lever bent and arranged to clear the main support or engine bed and give required range of oscillation; and, fifth, to supply means to automatically release the pawls from engagement with the engine shaft in event of back-firing or set them into engagement with the engine shaft and lock them out of engagement therewith. All of which objects, with others hereinafter more fully and particularly set forth, are attained by the mechanism illustrated in the accompanying drawing in which—

Figure 1 is a side view of the whole contrivance, as attached and connected to the engine bed or support, fragmentally shown with the engine shaft and the engine sheet-metal housing; Fig. 2, a top view of the forward end of Fig. 1; Fig. 3, a cross sectional view at 3 and 3, in Figs. 1 and 2,— the crank ratchet head being removed; Fig. 4, a longitudinal sectional view of the forward end of Fig. 1 and on the broken lines 4 4 of Fig. 3; and Fig. 5, a fragmental view similar to Fig. 3, but showing the movable parts in a different position.

Throughout all of these views similar parts are referred to by like reference numerals.

An attaching yoke, that also forms the principal stationary part of my contrivance, consists of an upper centrally semicircularly arched bar 5, and a like invertedly or reversely arched bottom or base bar 6. The feet or meeting ends of these arches are turned horizontally outward to form the fastening and connecting lugs 7. The bottom arch is seated between and on the sides 8 and 8 of the engine bed, as shown in Fig. 3. The curved clamping rod 9 is looped under the sides of the engine bed and its threaded ends are disposed upwardly through vertical perforations in the meeting ends of the arched bars to receive the securing nuts 10 and 10. The assembled seated arched bars form a stationary completely circular and horizontally-split member disposed concentrically around and spaced away from the base of the cylindrical clutch-head 11 on the forward end of the engine shaft 12.

A rocking or rockable cylindrical sleeve 13 is disposed through the annular space between the head 11 and the encircling yoke and has at its forward end an exterior annular groove 14 to engage and slidingly travel on the inner peripheral edge of the yoke and rock loosely around said clutch-head,—see Fig. 4. The rear end of this sleeve has a radial flange 15, an integral extension of which is shaped to form the downwardly-bent lever-arm 16, to carry at its outer end the connecting eye 17 outside of and below the top edge of the adjacent side 8 of the engine bed. The forward end of this rocking sleeve has the three integral arms 18, 18 and 18 extended longitudinally forward in the plane of the curved wall of the sleeve and spaced evenly around on the end thereof. The extended forward ends of these arms are reduced in width and shouldered to seat and have rigidly attached thereto the hooked base ends of the three curved spring pawls 19, 19 and 19; which pawls are thereby reciprocably carried around the concentrically inclosed clutch-head 11, when the sleeve is rocked in its supporting yoke.

The clutch-head is of the usual construction, having a cross-pin 20 disposed across the cup to be engaged by the crown ratchet-head 21 mounted on the crank shaft 22 operated by the crank 23 and retracting spring 24, all of the usual structure and operation; except, that the ends of the cross-pin are extended outwardly beyond the periphery of the clutch-head and shaped to form thereon a pair of diametrically-opposite teeth 25 and 25 hooked to only operatively engage the spring pawls when the sleeve is rocked to cause a forward revolution of the engine shaft.

The free ends of the spring pawls are widened backwardly and perforated to form the loops 40 to engage the inclined or hooked pin-teeth 25 on the clutch-head. These spring pawls are curved flatwise and set so that they normally agree with and lay close to the periphery of the clutch-head. But their free broadened ends 41 beyond the engaging loop is not thus bent; thereby forming an outwardly inclined terminal to engage and pass backwardly, to the direction of revolution of the engine shaft, over the inclined backs of the hooked pin teeth. Across these broadened ends are fastened the outwardly-crooked cleats 42 each terminating in a guide-lug 43 projecting laterally from the end of the spring pawl toward the forward face of the stationary yoke.

At three predetermined points spaced equally around the sleeve on the front face of the yoke are disposed the double-shouldered detents or rests 44, 44 and 44. These rests are spaced away from the periphery of the sleeve and from the points of the shoulders of these rests arms slope divergently inward toward the sleeve forming the inclined planes 45 and 46. These inclined planes are disposed from the periphery of the sleeve outwardly across the paths of the guide-lugs when the spring pawls are closed inwardly against the clutch-head or are in engagement with the hooked pin-teeth. Therefore, when the spring pawls are thus closed inwardly, if the sleeve is rocked backwardly, the lugs engage the inclined planes 46 raising the lugs to the front or adjacent shoulders of the rests and the loops of the spring pawls off of or out of the paths of the hooked pin teeth. In a similar manner, if the sleeve is rocked forwardly, at the end of the movement the guide-lugs will ascend the opposite planes 45 to the opposite or back shoulders of the rests.

Curved flanges or guide-ribs 47, 47 and 47, are curved concentrically with the rockable sleeve and disposed on the front face of the yoke, so that the guide-lugs may pass within their inner curve between them and the periphery of the sleeve. Their outer curves extended at their ends by the closed gates 48 and the gates 49 when closed end flush with the shoulders of the rests, to carry the guide-lugs from the back shoulder of one rest to the front shoulder of the next rest behind, while holding the spring pawls out of the paths of the hooked pin-teeth. Sections of these guide-ribs adjacent to the rests are hinged to swing outwardly forming gateways and gates 48 and 49 through which the guide-lugs may pass when moving along the inclined planes. These gates are all hinged by integral pintles 50 journaled through the yoke, as shown in Fig. 4, and the free ends of the gates are beveled to close against the inclined planes at the points of the shoulders of the rests. The gates 48 at the backs of the rests, are controlled by helical springs 51 connected to the pintles at the back of the yoke, to yieldingly retain these gates closed; so that the guide-lugs can only pass outwardly along the inclined planes 45. The gates 49 at the fronts of the rests are controlled by like helical springs 52 similarly connected to act in a reverse direction and yieldingly retain the front gates open; these front gates are only closed by the guide-lugs returning along the outer curve or guideway of the guide-ribs to pass the lugs smoothly across the gateways over onto the front shoulders of the rests. The lugs 53 on the outer edge of the front of the yoke limit the outward or opening swing of the gates.

Rearwardly from the bent lever-arm 16 a bell-crank or angled lever is pivoted at its angle on a support 26 seated and secured on the adjacent side of the engine bed. The horizontal forwardly disposed arm 27 of this bell-crank has on its free end a connecting eye 28 of structure like the eye 17 at the free end of the bent arm or lever 16. The connecting-rod 29 has like eyes at its ends closed through the eyes 17 and 28. The metal stock bent to form these four eyes is of diameter of cross-section equal to the inner diameter of the eyes through which it is closed; therefore, these connections are universal joints, allowing the connected arms and the connecting-rod to freely move to any angle to each other and the connecting-rod to take either compression or tensional strain without lost motion. The planes of rotation of the bent lever-arm 16 and the arm 27 are at right angles to each other; and the arc paths of the universal joints cut each other at two points, bringing these connected parts to work directly and freely over the greatest possible arcs of movement.

At the base of the rear end of the engine casing or housing 30 the operating lever 31 has its lower end pivoted to the support 32 on the side of the engine bed. The operating lever is connected to the vertical arm 33 of the bell-crank by the horizontal connecting-bar 34. The top of the operating lever is within easy reach of the driver and is bent laterally outward to form a horizontal handle 35. On this handle the revoluble sleeve covering 36 is mounted to turn in either direction and is eccentrically connected to raise the spring actuated locking hook 37 off of the catch 38 on the housing, to release the lever from its locked vertical position, indicated by the broken lines 39.

In operation, if the operating lever is vertically locked, its position and the positions of the mechanism connecting it with the rocking sleeve are indicated by the dotted lines 39, in Fig. 1. In this position the guide-lugs will rest on the forward shoulders of the rests, the spring pawl loops will be swung out of the paths of the hooked pin teeth and the bent lever on the rocking sleeve flange will be hooked down under the side of the engine bed, all as shown in Fig. 5. Locked in this position the contrivance is entirely out of connection with any action of the engine and does not interfere with the engine being started by the hand crank in the usual manner. An engine will not always stop with the cross-pin 20 exactly in the chosen vertical position shown, although it usually does so. While there are only two of the diametrically opposite pin teeth, there are three equally spaced spring pawls, so that engagement takes place between one of the pawls and one of the teeth, irrespective of where the engine stops, by only a slight movement of the unlocked operating lever; the sweep of which lever is sufficient to carry the engine over its dead center. As the gates 49 normally stand open, it is obvious that the guide-lugs can only leave the forward shoulders of the rests by passing inwardly along the inclined planes 46, letting the spring pawl loops swing into the paths of the hooked pin teeth when the operating lever is swung from its locked position. If the guide-lugs are passed to the opposite ends of the inner guideways they will slide out on the inclined planes 45 forcing the gates 48 open to pass through onto the back shoulders. Instantly following the passage of the guide-lugs the gates 48 close and the guide-lugs must return along the outer guide-way; thus retaining the pawl loops out of the paths of the hooked pin teeth; and forcing the gates 49 closed to carry the guide-lugs over onto the front shoulders and all parts into locked position again. If by back-firing or for other reasons the passage of the guide-lugs are arrested before reaching the forward ends of the inner guide-ways, they pass reversely along the inclined planes to the front shoulders of the rests, carrying the spring pawls out of commission and the operating lever into locked position again.

I claim:

1. An automobile engine starter, comprising a peripherally toothed head mounted rigidly on the engine shaft, a stationary circular support disposed around and spaced away from said toothed head, a cylindrical rockable sleeve disposed in the annular space between the support and head and having an exterior annular groove to slidingly travel on the inner periphery of the stationary circular support, a pawl disposed on said sleeve to engage the peripheral teeth on said head, a guide-lug on the pawl, an inclined plane on the stationary support to engage the guide-lug and throw the pawl out of engagement with said teeth, and a curved guide-rib on the stationary support to slidingly carry the guide-lug and retain the pawl out of engagement with said toothed head.

2. An automobile engine starter, comprising a clutch-head mounted rigidly on the engine shaft and having a pair of radial teeth disposed diametrically opposite, a circular support disposed around and spaced away from said clutch-head, a rocking sleeve disposed in the annular space between the head and support and having an exterior annular groove to engage and travel on the inner periphery of the circular support and loosely around the clutch-head, and three spring pawls spaced evenly around on the sleeve and disposed to engage the radial teeth on the clutch-head.

3. An automobile engine starter, comprising a cylindrical cup-shaped clutch-head mounted rigidly on the forward end of the engine shaft and having a cross-pin disposed through the cup and the ends of the pin shaped to form a pair of diametrically opposite hooked teeth on the periphery of the head, a circular yoke disposed concentrically around the base of said clutch-head, spaced away therefrom and fastened stationarily on the engine bed, a cylindrical rocking sleeve disposed in the annular space between said yoke and head and having an exterior groove to engage and travel on the inner periphery of the yoke and loosely around the head, and three spring pawls spaced equally around on the sleeve to engage said hooked teeth on the head.

4. An automobile engine starter, comprising a cylindrical cup-shaped clutch-head mounted at its base on the front end of the engine shaft, a pin disposed diametrically through the cup and its ends projected to form peripheral teeth on the head, a circular yoke disposed concentrically around and spaced away from the periphery of the base of the head and seated stationarily on the engine bed, a cylindrical sleeve disposed in the annular space between the head and the yoke and having an exterior groove to engage and slide on the inner periphery of the yoke to rock loosely around the base of the head, longitudinal projecting arms on the forward end of the sleeve, and spring pawls having their bases fastened to said arms, bent to normally lie against the periphery of the clutch-head and their free ends looped to engage the peripheral teeth.

5. An automobile engine starter, comprising a cupped clutch-head mounted on the forward end of the engine shaft for ordinary cranking a cross-pin disposed through the cupped head and the ends of the pin projected to form a pair of diametrically opposite teeth on the periphery of the head, a stationary circular yoke of larger internal diameter than the outer diameter of the clutch-head, disposed concentrically around the base of the cupped head and fastened to the engine bed, a cylindrical rocking sleeve disposed in the annular space between the base of the cupped clutch-head and the surrounding circular yoke and having an annular groove to slidably seat on the inner curve of the yoke, longitudinally projected arms on the forward end of the rockable sleeve, spring pawls on the arms to engage the teeth on the clutch-head, guide-lugs on the pawls, and concentrically curved guide-ribs on the yoke to engage the guide-lugs.

6. An automobile engine starter, comprising a cylindrical head having hooked peripheral teeth and mounted on the fore end of the engine shaft, a stationary circular yoke disposed concentrically around and spaced away from said head, a rocking sleeve disposed in the annular space around the head and having an exterior annular groove to seat and slide on the inner periphery of the yoke, spring pawls on the forward end of the sleeve set to normally engage said hooked teeth and having guide-lugs on their free ends, and inclined planes on the yoke to engage the guide-lugs and bend the pawls out of the paths of the teeth.

7. An automobile engine starter, comprising a cylindrical clutch-head having hooked peripheral teeth and mounted on the engine shaft, a stationary circular yoke of internal diameter greater than the exterior diameter of the clutch-head and disposed concentrically therearound, a rocking sleeve disposed through the annular space between the head and the yoke and having an exterior annular groove to engage and slide on the inner periphery of the yoke, spring pawls on the sleeve to normally engage the teeth on the head, stationary rests on the yoke to support the free ends of the pawls out of the paths of the peripheral teeth on the head, and inclined planes to bend and seat the pawls on the rests.

8. An automobile engine starter, comprising a cylindrical head having a pair of diametrically opposite hooked peripheral teeth and mounted on the forward end of the engine shaft, a stationary circular yoke of internal diameter greater than the exterior diameter of the head and disposed concentrically therearound, a rockable sleeve disposed through the annular space between the head and the yoke and having an exterior annular groove to receive the inner periphery of the yoke and rockably slide therein, three spring pawls spaced evenly around on the forward end of the sleeve to normally stand in the paths of and engage the peripheral teeth on the head, three stationary rests on the yoke spaced equally around and outwardly from the sleeve to hold the swinging ends of the pawls out of the paths of the teeth, and inclined planes to engage and bend the pawls to simultaneously set their free ends on the rests.

9. An automobile engine starter, comprising a toothed head mounted rigidly on the engine shaft, a stationary circular yoke of greater internal diameter than the exterior diameter of the toothed-head and disposed concentrically therearound, said yoke split centrally into semicircles having corresponding fastening lugs at their meeting bases, one semicircle seated on the engine bed and a U-shaped fastening rod looped around the bed and its threaded ends disposed through the fastening lugs and provided beyond with threaded nuts, a rockable sleeve disposed in the annular space between the toothed head and the inner periphery of the yoke and having an exterior groove to receive and slide on the inner peripheral edge of the yoke, and pawls on the rockable sleeve to engage the teeth on the head.

10. An automobile engine starter, comprising a cylindrical toothed head mounted on the engine shaft to turn therewith, a stationary circular support disposed concentrically around and spaced away from said head, a cylindrical sleeve disposed through the annular space around the head and having an exterior annular groove to rockably seat it on the inner peripheral edge of the circular support, pawls on one end of the sleeve to engage the teeth on the head, and a radial arm on the opposite end of the sleeve by which to rock it in the circular support.

11. An automobile engine starter, comprising a cylindrical head having radial peripheral teeth and mounted on the engine shaft to turn therewith, a stationary circular support disposed concentrically around the head and spaced away therefrom, a cylindrical sleeve disposed in the annulus between the head and support and having an exterior annular groove to seat it rockably slidable on the inner peripheral edge of the circular support, spring pawls fastened to the sleeve to normally engage the teeth on the head, guide-lugs on the pawls, concentrically curved guide-ribs on the stationary support to engage the guide-lugs and retain the pawls out of engagement with the teeth on the head, and inclined planes to carry the lugs out onto the guide-ribs.

12. An automobile engine starter, comprising a toothed head mounted on the engine shaft, a stationary circular support disposed concentrically around said head, a circular pawl carrier mounted in said stationary support to rock around said toothed head, spring pawls mounted on said carrier to normally engage the teeth on said head, rests on the stationary support to retain the pawls out of engagement with the teeth, inclined planes at the fronts and backs of the rests to engage the pawls and swing them onto the rests, concentrically curved guide-ribs to retain the backwardly moving pawls out of engagement with the toothed head, spring-pressed gates through the guide-ribs at the backs of the rests to normally stand closed against the inclined planes, and spring-pressed gates through the guide-ribs at the fronts of the rests to normally stand open from the inclined planes.

13. An automobile engine starter, comprising a toothed head mounted on the engine shaft, a stationary circular support disposed concentrically around said head, a circular pawl carrier mounted in said stationary support to rock around said head, a spring pawl mounted on said carrier to normally engage the teeth on said head, rests on the stationary support at each end of the movement of the pawl by its rocking carrier to retain the pawl out of engagement with the teeth on the head, inclined planes at each end of the rocking movement to bend the pawl onto the rests, a concentrically curved guide-rib between the rests to retain the backwardly-moving pawl out of the path of the teeth, a spring-pressed gate through the guide-rib at the back rest to normally stand open, and a spring-pressed gate through the guide-rib at the front rest to normally stand closed.

14. An automobile engine starter, comprising a toothed head mounted on the forward end of the engine shaft, a stationary circular yoke disposed concentrically around the toothed head and seated on the engine bed, a cylindrical rocking sleeve mounted in the yoke through an annular space between the head and the yoke, pawls on the sleeve to engage the toothed head, a radial arm on the sleeve bent to swing around outside of the engine bed, a bell-crank pivoted to the engine bed to swing in a plane at right angles to the rotary plane of said bent arm, a connecting-rod coupled to the bent arm and to one arm of the bell-crank by universal joints, an operating lever pivotally footed at the rear of the engine housing, and a connecting-bar coupled to the bell-crank and to the operating lever.

In testimony whereof I have affixed my signature in presence of two witnesses.

HARRY B. FENNER.

Witnesses:
J. W. MARTIN,
G. E. REIFF.

---

Copies of this patent may be obtained for five cents each, by addressing the "Commissioner of Patents, Washington, D. C."